US009988870B2

(12) United States Patent
Gray

(10) Patent No.: US 9,988,870 B2
(45) Date of Patent: Jun. 5, 2018

(54) SYSTEM AND METHOD FOR NON-INVASIVE POWER AND DATA TRANSMISSION

(71) Applicant: Cameron International Corporation, Houston, TX (US)

(72) Inventor: Conor Gray, Longford (IE)

(73) Assignee: Cameron International Corporation, Houston, TX (US)

( * ) Notice: Subject to any disclaimer, the term of this patent is extended or adjusted under 35 U.S.C. 154(b) by 0 days. days.

(21) Appl. No.: 15/222,702

(22) Filed: Jul. 28, 2016

(65) Prior Publication Data

US 2017/0030160 A1 Feb. 2, 2017

Related U.S. Application Data

(60) Provisional application No. 62/199,898, filed on Jul. 31, 2015.

(51) Int. Cl.
E21B 33/03 (2006.01)
E21B 43/12 (2006.01)
(Continued)

(52) U.S. Cl.
CPC .......... *E21B 33/03* (2013.01); *E21B 33/0385* (2013.01); *E21B 33/04* (2013.01);
(Continued)

(58) Field of Classification Search
CPC ...... E21B 33/03; E21B 33/0385; E21B 33/04; E21B 33/043; E21B 43/12; E21B 47/06;
(Continued)

(56) References Cited

U.S. PATENT DOCUMENTS 2,483,815 A * 10/1949 Easton .................... H01F 38/14
335/205
3,550,682 A 12/1970 Fowler
(Continued)

FOREIGN PATENT DOCUMENTS

DE 102007036626 A1 2/2009
FR 2165074 A5 8/1973
(Continued)

OTHER PUBLICATIONS

PCT International Search Report & Written Opinion; Application No. PCT/US2016/044903; dated Oct. 20, 2016; 15 pages.

Primary Examiner — Qutbuddin Ghulamali
(74) Attorney, Agent, or Firm — Fletcher Yoder P.C.

(57) ABSTRACT

Embodiments of the present disclosure are directed to a system including a flange configured to couple to a component of a mineral extraction system, where the flange includes a base, an exterior annular tapered portion extending from the base, and an annular wall extending from the exterior annular tapered portion, wherein the annular wall at least partially defines a central exterior cavity and at least partially defines an interior annular cavity. The system also includes an inductive power and data transmission system mounted within the flange, wherein the inductive power and data transmission system comprises a first component and a second component, wherein the first and second components are separated by the annular wall.

19 Claims, 5 Drawing Sheets

(51) Int. Cl.
    *E21B 33/04*      (2006.01)
    *E21B 47/06*      (2012.01)
    *E21B 47/12*      (2012.01)
    *E21B 33/038*     (2006.01)
    *E21B 33/043*     (2006.01)
    *H02J 50/10*      (2016.01)
    *H01F 38/14*      (2006.01)
    *H04B 5/00*       (2006.01)
    *H01F 38/18*      (2006.01)
    *E21B 33/12*      (2006.01)
    *E21B 34/06*      (2006.01)

(52) U.S. Cl.
    CPC ............ *E21B 33/043* (2013.01); *E21B 43/12* (2013.01); *E21B 47/06* (2013.01); *E21B 47/065* (2013.01); *E21B 47/12* (2013.01); *H01F 38/14* (2013.01); *H01F 38/18* (2013.01); *H02J 50/10* (2016.02); *H04B 5/0031* (2013.01); *H04B 5/0037* (2013.01); *H04B 5/0075* (2013.01); *E21B 33/12* (2013.01); *E21B 34/06* (2013.01)

(58) Field of Classification Search
    CPC ........ E21B 47/065; E21B 47/12; H02J 50/80; H02J 50/10; H01F 38/14; H04B 5/0031; H04B 5/0037; H04B 5/0075
    USPC ...................................... 340/854.8
    See application file for complete search history.

(56) References Cited

U.S. PATENT DOCUMENTS

| | | | | |
|---|---|---|---|---|
| 4,852,648 | A * | 8/1989 | Akkerman | E21B 17/003 166/66.4 |
| 5,264,997 | A | 11/1993 | Hutchisson et al. | |
| 5,278,550 | A | 1/1994 | Rhein-Knudsen et al. | |
| 5,455,573 | A | 10/1995 | Delatorre | |
| 6,394,837 | B1 * | 5/2002 | Edwards | E21B 33/0385 166/338 |
| 8,913,687 | B1 * | 12/2014 | Huang | H04B 5/0031 375/295 |
| 2010/0052941 | A1 | 3/2010 | Madhavan et al. | |
| 2011/0287712 | A1 | 11/2011 | Conway et al. | |
| 2011/0309687 | A1 * | 12/2011 | Bohori | E21B 33/0385 307/104 |
| 2012/0139357 | A1 * | 6/2012 | Teggatz | H02J 5/005 307/104 |
| 2017/0030160 | A1 * | 2/2017 | Gray | H04B 5/0031 |

FOREIGN PATENT DOCUMENTS

| | | |
|---|---|---|
| GB | 2440571 A | 2/2008 |
| GB | 2455628 A | 6/2009 |
| WO | 2013009276 A1 | 1/2013 |
| WO | 2013076474 A2 | 5/2013 |

\* cited by examiner

SYSTEM AND METHOD FOR NON-INVASIVE POWER AND DATA TRANSMISSION

CROSS-REFERENCE TO RELATED APPLICATION

This application claims priority to and benefit of U.S. Provisional Patent Application No. 62/199,898, entitled "SYSTEM AND METHOD FOR NON-INVASIVE POWER AND DATA TRANSMISSION," filed Jul. 31, 2015, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. In order to meet the demand for such natural resources, numerous companies invest significant amounts of time and money in searching for and extracting oil, natural gas, and other subterranean resources from the earth. Particularly, once a desired resource is discovered below the surface of the earth, drilling and production systems are often employed to access and extract the resource. These systems can be located onshore or offshore depending on the location of a desired resource. Further, such systems generally include a wellhead assembly through which the resource is extracted. These wellhead assemblies generally include a wide variety of components and/or conduits, such as various control lines, casings, valves, and the like, that control drilling and/or extraction operations.

In drilling and extraction operations, various components and tools, in addition to and including wellheads, are employed to provide for drilling, completion, and production of a mineral resource. Further, during drilling and extraction operations, one or more seals or plugs may be employed to regulate and/or isolate pressures and the like. For instance, a wellhead system often includes a tubing hanger or casing hanger that is disposed within the wellhead assembly and configured to secure tubing and casing suspended in the well bore. The hanger generally provides a path for hydraulic control fluid, chemical injections, or the like to be passed through the wellhead and into the well bore. Additionally, the tubing hanger provides a path for production fluid to be passed through the wellhead and exit the wellhead through a production flow bore to an external production flow line. In certain circumstances, valve removal plugs may be used in the wellhead to provide pressure isolation during installation and removal of valves, such as production valves, gate valves, and the like. Additionally, there is a need to measure operating parameters (e.g., temperature and pressure) in a wellbore and/or annuli of the wellhead (e.g., in an annulus between a tubing hanger or casing hanger and a wellhead assembly) without compromising a pressure barrier of the wellbore and/or annuli of the wellhead.

BRIEF DESCRIPTION OF THE DRAWINGS

Various features, aspects, and advantages of the present invention will become better understood when the following detailed description is read with reference to the accompanying figure, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present disclosure are directed toward flanges (e.g., a structural component) and a power and data transmission system (e.g., an inductive power and data transmission system) for use with the flanges (e.g., structural component). The flanges and power and data transmission described below may be used with a wellhead of a mineral extraction system. In particular, the flanges and power and data transmission system enable the measuring of one or more operating parameters (e.g., temperature, pressure, etc.) within the wellhead without any aperture or penetration in the flange. In other words, power and data may be transmitted to and from a data acquisition unit external to the wellhead and sensors within the wellhead without wires or cables extending through the flange and coupling the data acquisition unit and the sensors. For example, the flange and power and data transmission system may be mounted to the wellhead over a valve removal plug having one or more integrated sensors. The operation of the flange and the power and data transmission system enables power and data transmission from an external data acquisition unit and the valve removal plug sensors without compromising a pressure barrier sealed by the flange. In this manner, collection of data within the wellhead may be improved, while also improving pressure containment within the wellhead.

Figure 1:
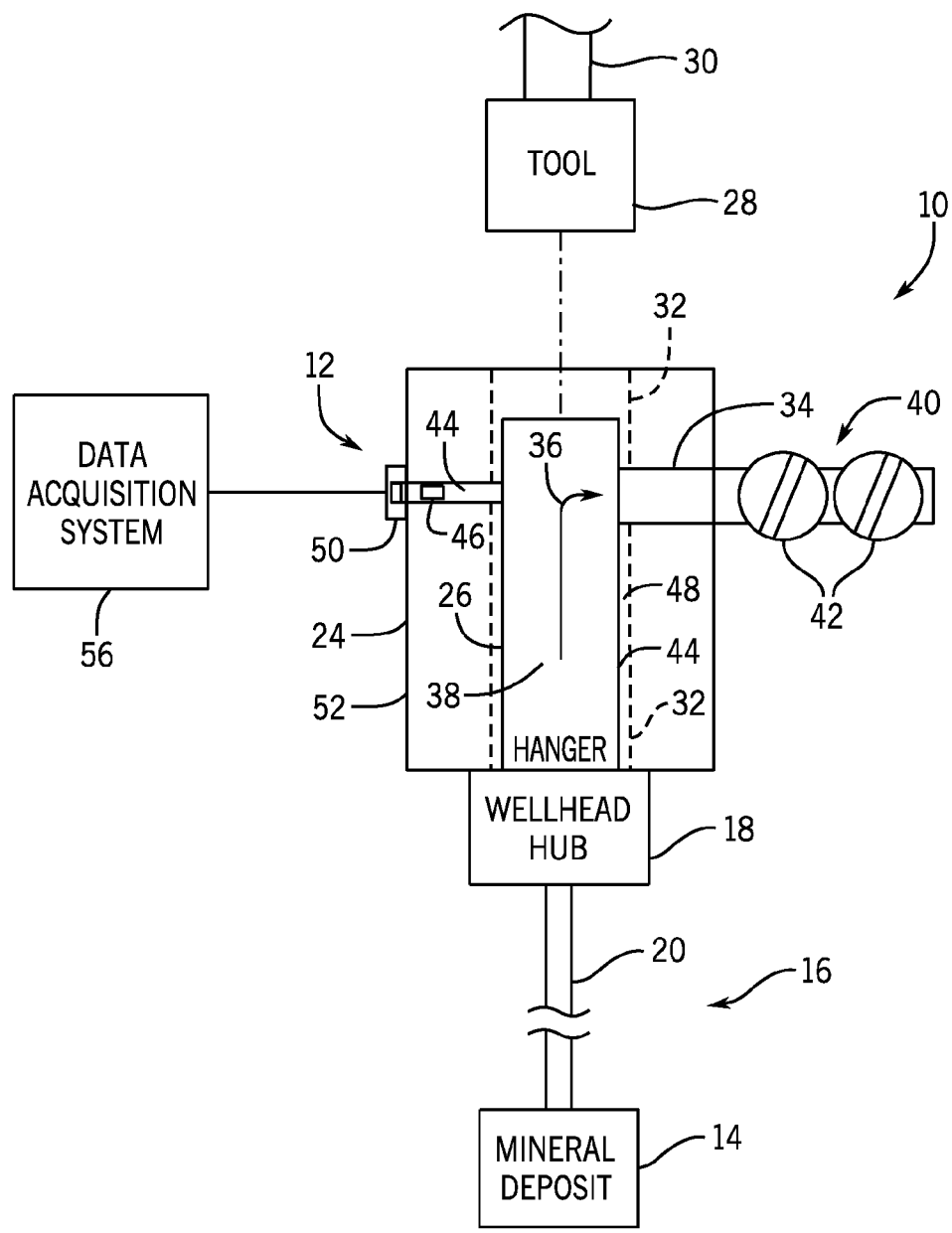
FIG. 1 is a block diagram of a mineral extraction system, in accordance with embodiments of the present disclosure.

Turning now to the drawings, FIG. 1 illustrates a mineral extraction system 10. The illustrated mineral extraction system 10 can be configured to extract various minerals and natural resources, including hydrocarbons (e.g., oil and/or natural gas), for instance. Further, the system 10 may be configured to inject substances, such as chemicals, steams, or other fluids to enhance mineral extraction. In some embodiments, the mineral extraction system 10 is land-based (e.g., a surface system) or subsea (e.g., a subsea system). As illustrated, the system 10 includes a wellhead 12 coupled to a mineral deposit 14 via a well 16. For example, the well 16 includes a wellhead hub 18 and a well-bore 20.

The wellhead hub 18 may include a large diameter hub that is disposed at the termination of the well bore 20 near the surface. Thus, the wellhead hub 18 may provide for the connection of the wellhead 12 to the well 16. The wellhead 12 may be coupled to a connector of the wellhead hub 18, for instance. Accordingly, the wellhead 12 may include a complementary connector, like a collet connector.

The wellhead 12 generally includes a series of devices and components that control and regulate activities and conditions associated with the well 16. For example, the wellhead 12 may provide for routing the flow of produced minerals from the mineral deposit 14 and the well bore 20, provide for regulating pressure in the well 16, and provide for the injection of chemicals into the well bore 20 (down-hole). In the illustrated embodiment, the wellhead 12 includes a tubing spool tree 24 (e.g., a tubing spool, tubing head, horizontal tubing spool tree, casing head, or casing spool) and a hanger 26 (e.g., a tubing hanger or a casing hanger). The system 10 may also include devices that are coupled to the wellhead 12, and those that are used to assemble and control various components of the wellhead 12. For example, in the illustrated embodiment, the system 10 also includes a tool 28 suspended from a drill string 30. In certain embodiments, the tool 28 may include running tools that are lowered (e.g., run) from an offshore vessel to the well 16, the wellhead 12, and the like.

The tubing spool tree 24 generally includes a variety of flow paths (e.g., bores), valves, fittings, and controls for operating the well 16. For instance, the tubing spool tree 24 may include a frame that is disposed about a body, a flow-loop, actuators, and valves. Further, the tubing spool tree 24 may provide fluid communication with the well 16. For example, the illustrated tubing spool tree 24 includes a spool bore 32. The spool bore 32 may provide for completion and workover procedures, such as the insertion of tools (e.g., the hanger 26) into the well 16, the injection of various chemicals into the well 16 (down-hole), and the like. Further, minerals extracted from the well 16 (e.g., oil and natural gas) may be regulated and routed via the tubing spool tree 24. For instance, the tubing spool tree 24 includes a horizontal flow bore 34 (e.g., a production flow bore) configured to enable a flow from or into the well 16. For example, the flow bore 34 may enable a flow of produce minerals from the well 16 to shipping or storage facilities, as indicated by arrow 36. More specifically, the horizontal flow bore 34 is in fluid communication with a tubing hanger bore 38 that is fluidly connected to the wellbore 20. Thus, produced minerals may flow from the well bore 20, through the tubing hanger bore 38, and through the fluid bore 34. In other embodiments, the horizontal flow bore 34 may be used to inject a flow (e.g., a chemical mixture) into the well 16. For example, the horizontal flow bore 34 may be used to inject fluids for a fracking process. While the illustrated embodiment of the tubing spool tree 24 illustrates one horizontal flow bore 34, other embodiments may include 2, 3, 4, 5, 6, or more horizontal flow bores 34.

A flow through the horizontal flow bore 34 (e.g., flow of produced minerals) may be regulated by a flow valve tree 40 disposed along the flow bore 34 and coupled to the tubing spool tree 24. The flow valve tree 40 includes valves 42, which may be opened and closed to regulate flow through the horizontal flow bore 34.

The tubing hanger bore 38 may also provide access to the well bore 20 for various completion and worker procedures. For example, components may be run down to the wellhead 12 and disposed in the tubing hanger bore 34 to seal-off the well bore 20, to inject chemicals down-hole, to suspend tools down-hole, to retrieve tools down-hole, and the like.

As will be appreciated, mineral extractions systems 10 are often exposed to extreme conditions. For example, during drilling and production of a well 16, the well bore 20 may include pressures up to and exceeding 10,000 pounds per square inch (PSI). Accordingly, mineral extraction systems 10 generally employ various mechanisms, such as seals, plugs, and valves, to control and regulate the well 16. For instance, the hanger 26 (e.g., tubing hanger or casing hanger) that is disposed within the wellhead 12 secures tubing and casing suspended in the well bore 20, and provides a path for hydraulic control fluid, chemical injections, and the like to be passed down-hole. In certain circumstances, it may be desirable to install, remove, repair, and/or replace one or more valves within the wellhead 12, while the wellhead 12 is under pressurized conditions. Accordingly, the tubing spool tree 24 may include a side port or outlet 44 (e.g., a flanged side outlet). For installation, removal, or repair of a valve of the wellhead 12 (e.g., a gate valve or annulus gate valve), a valve removal plug 46 is positioned within the side outlet 44 to isolate pressure within an annular region 48 (e.g., pressure containing region) between the hanger 26 and the tubing spool tree 24 of the wellhead 12. In certain embodiments, the valve removal plug 46 may be threaded within the side outlet 44, or the valve removal plug 46 may be cold welded within the side outlet 44. The wellhead 12 further includes a flange 50 mounted on an exterior surface 52 of the tubing spool tree 24 over the side outlet 44. As will be appreciated, the flange 50 is configured to further retain the valve removal plug 46 within the side outlet 44.

As mentioned above, the presently disclosed embodiments include a flange (e.g., flange 50), mount, cover, fluid barrier, fluid containment structure, or other component and a power and data transmission system 54, which are configured to enable power and data transmission between an external data acquisition unit 56 and sensors disposed within the wellhead 12 without compromising a pressure barrier of the wellhead 12. More specifically, the flange 50 and 54 power and data transmission system 54 may transfer power and data between the data acquisition unit 56 and sensors integrated with the valve removal plug 46 without cables extending from the data acquisition unit 56 to the sensors of the valve removal plug 46 (e.g., through the flange 50). As a result, the flange 50 may not include any apertures or penetrations. The disclosed flange 50 and power and data transmission system 54 enables the collection of data from within the wellhead 12 (e.g., the annular region 48, the well bore 20, or other annulus or region within the wellhead 12), while also providing an additional pressure barrier between the annular region 48 the exterior of the wellhead 12 to supplement the pressure isolation provided by the valve removal plug 46.

Figure 2:
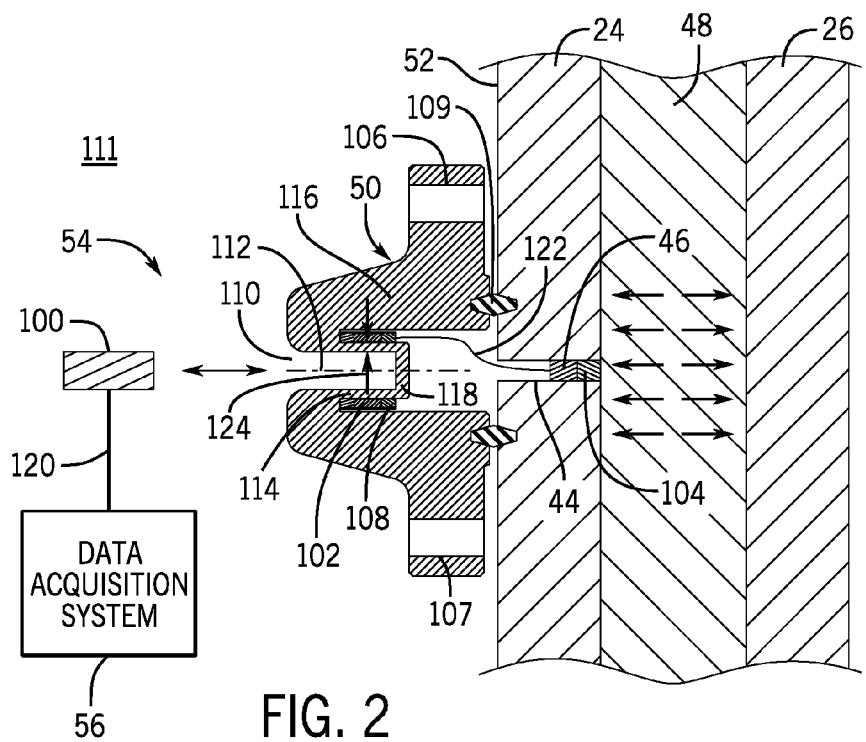
FIG. 2 is a partial schematic of the mineral extraction system, illustrating a flange having a power and data transmission system, in accordance with embodiments of the present disclosure.

FIG. 2 is a partial schematic of the mineral extraction system 10, illustrating the flange 50 and the power and data transmission system 54. As mentioned above, the flange 50 is mounted to the exterior surface 52 of the tubing spool tree 24 over the side outlet 44 of the tubing spool tree 24. The power and data transmission system 54 has multiple components that mount within the structure of the flange 50. Specifically, the power and data transmission system 54 includes a first core 100 (e.g., a primary transformer core) and a second core 102 (e.g., a secondary transformer core). The structural and electrical composition of the first and second cores 100 and 102 are described in further detail below.

The first core 100 is disposed on an exterior side of the flange 50 and is electrically coupled to the data acquisition system 56. The first core 100 is also removable from the flange 50. The removability of the first core 100 may enable replacement of the first core 100 with another first core 100 coupled to another data acquisition system 56 (e.g., a hand-held, battery-operated data acquisition system). The second core 102 is disposed on a pressure barrier side of the flange 50 and is electrically coupled to the valve removal plug 46, which has at least one integrated sensor 104 (e.g., pressure, temperature, flow rate, fluid composition, or other type of sensor). As described in detail below, the first and second cores 100 and 102 transfer energy between one another via inductive coupling (e.g., wireless coupling) to transfer power and data between the data acquisition system 56 and the sensor 104 of the valve removal plug 46.

In the illustrated embodiment, the flange 50 has a base 106 (e.g., an annular base) that is mounted to the exterior surface 52 of the tubing spool tree 24 about the side outlet 44. For example, the base 106 may include bolt holes or apertures 107 through which bolts may be used to mount the base 106 to the tubing spool tree 24. A seal or gasket 109 (e.g., a metal to metal ring gasket) is positioned between the flange 50 and the exterior surface 52 of the tubing spool tree 24 to create a sealing interface between the flange 50 and the tubing spool tree 24. In one embodiment, the flange 50 is mounted to the tubing spool tree via mechanical fasteners, such as bolts or other threaded fasteners.

The flange 50 has a geometry and structure that enable the first and second cores 100 and 102 to couple to one another via induction. In the illustrated embodiment, the flange 50 has an interior annular cavity 108 and a central exterior cavity 110, which are coaxial and concentric with one another along a central axis 112 of the flange 50. As shown, the interior annular cavity 108 is exposed to the side outlet 44 when the flange 50 is mounted to the tubing spool tree 24. In contract, the central exterior cavity 110 is exposed to an environment 111 surrounding the tubing spool tree 24. The interior annular cavity 108 and the central exterior cavity 110 are separated by an annular wall 114. The interior annular cavity 108 is generally defined by the annular wall 114 and an exterior annular tapered portion 116 of the flange 50, and the central exterior cavity 110 is generally defined by the annular wall 114 and a central cavity base 118 fixed to an axial end of the annular wall 114 of the flange 50. The central cavity base 118 is cross-wise (e.g., generally perpendicular) to the central axis 112 of the flange 50.

As shown, the first core 100 is configured to be disposed within the central exterior cavity 110, while the second core 102 is disposed within the inner annular cavity 108. When the first and second cores 100 and 102 are mounted within the flange 50, the first and second cores 100 and 102 overlap with one another, such that the first and second cores 100 and 102 are coaxial and concentric. This spatial relationship between the first and second cores 100 and 102 enables induction coupling between the first and second cores 100 and 102, and thus enables transfer of energy between the first and second cores 100 and 102. As a result, power may be transferred from the data acquisition unit 56 to the first core 100 (e.g., via a cable 120), from the first core 100 to the second core 102 (e.g., via induction), and from the second core 102 to the sensor 104 (e.g., via cable 122). Data from the sensors 104 may be similarly be transferred from the sensor 104 to the data acquisition unit 56. In certain embodiments, data may also be transferred from the data acquisition unit 56 to the sensor 104 in the manner described above. The composition (e.g., electrical circuitry) and operation of the data acquisition unit 56, the first and second cores 100 and 102, and the sensor 104 is described in further detail below.

As discussed above, the disclosed structure of the flange 50 enables inductive coupling, and thus energy transfer, between the first and second cores 100 and 102. Additional design parameters of the flange 50 may also be considered to enable, improve, and optimize inductive coupling between the first and second cores 100 and 102. For example, a thickness 124 of the annular wall 114, which is the gap between the coaxial and concentric first and second cores 100 and 102, may be selected to enable, improve, and optimize inductive coupling between the first and second cores 100 and 102. In certain embodiments, the thickness 124 may be approximately 1 to 10, 2 to 8, 3 to 6, or 4 to 5 mm. As will be appreciated, the thickness 124 may be selected to optimize inductive coupling between the first and second cores 100 and 102, while also optimizing the structural integrity of the flange 50. That is, the thickness 124 may be selected such that the flange 50 is configured to withstand a certain pressure threshold (e.g., a maximum anticipated pressure) within the wellbore 12 (e.g., the annular region 48).

In certain embodiments, the flange 50 may be made from a material to enable inductive coupling between the first and second cores 100 and 102. More specifically, the flange 50 may be formed from a material that is generally low conductivity (e.g., a material that has a low conductivity and high resistivity), non-ferrous, and non-magnetic. For example, the flange 50 may be made from a metal, metallic alloy (e.g., Inconel or other metallic alloy, such as a nickel-chromium-based alloy), plastic, ceramic, or other suitable material of low conductivity and low permeability. As will be appreciated, low conductivity and non-magnetic materials may not interfere with the magnetic flux generated during inductive coupling. Therefore, the flange 50 is made from a generally non-magnetic and low conductivity material to reduce interference (e.g., eddy currents) in the electromagnetic field generated between first and second cores 100 and 102. For example, the annular wall 114 between the first and second cores 100 and 102 may behave as a vacuum or near-vacuum when a magnetic flux is generated between first and second cores 100 and 102 and not create interference (e.g., eddy currents) that may reduce the efficiency and effectiveness of the inductive coupling between the first and second cores 100 and 102.

In certain embodiments, low conductivity and non-magnetic metals and metallic alloys (e.g., Inconel) may be used to form the flange 50 to improve the strength of the flange 50. Such metals may have high strengths (e.g., strong in compression and able to resist elevated pressures from within the wellhead 12), thereby making low conductivity and non-magnetic metals and metallic alloys suitable for the flange 50. Additionally, metals and metallic alloys may be malleable and/or corrosion resistant, thereby improving machinability and/or operation of the flange 50 in a mineral extraction environment.

As mentioned above, the power and data transmission system 54 enables the transfer of power and data between the data acquisition unit 56 and the sensor 104 via induction coupling (e.g., wireless coupling) of the first and second cores 100 and 102. This method of power and data transmission does not require direct coupling of the first and second cores 100 and 102 via cables or wires. Accordingly, the flange 50 may be formed without apertures or other holes that may reduce the pressure isolating capability of the flange 50. In certain embodiments, the flange 50 may be formed from a single piece low conductivity and non-magnetic metal and/or metallic alloy (e.g., Inconel or other metallic alloy). In other words, the base 106, annular wall 114, exterior annular tapered portion 116, and central cavity base 118 of the flange 50 may be integral with one another as one piece. For example, the flange 50 may be formed by machining, casting, or other suitable process. The absence of holes or apertures for cables and wires (e.g., formed in the annular wall 114 and/or central cavity base 118) increases the pressure isolating capability of the flange 50.

Figure 3:
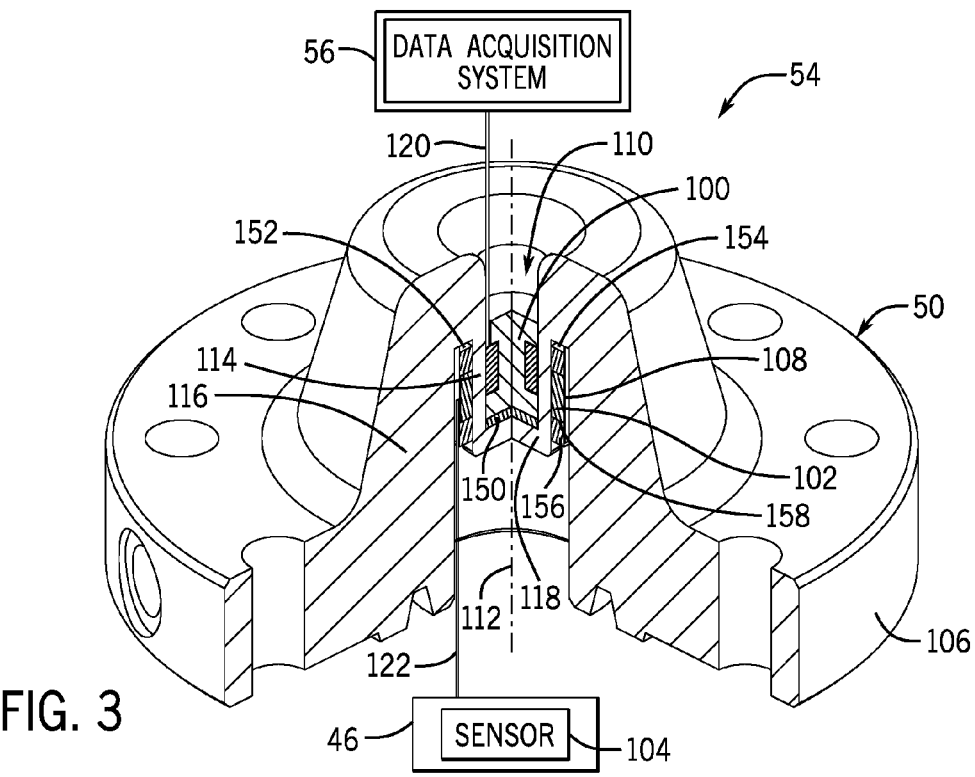
FIG. 3 is a cut-away perspective view of a flange having a power and data transmission system, in accordance with embodiments of the present disclosure.

FIG. 3 is a cut-away perspective view of the flange 50, illustrating the first and second cores 100 and 102 mounted within the flange 50. Specifically, the first core 100 is mounted within the central exterior cavity 110, and the second core 102 is mounted within the interior annular cavity 108, such that the first and second cores 100 and 102 are generally concentric and coaxial with one another. The annular wall 114 of the flange 50, which may be approximately 5 mm thick, separates the first and second cores 100 and 102. In other embodiments, the thickness of the annular wall 114 may be a percentage (e.g., 5, 10, 15, 20, 25, 30, or other percent) of a diameter of the side outlet 44 or of a diameter of the annular wall 114. In operation, power and data may be transmitted between the data acquisition system 56 and the sensor 104 via inductive coupling (e.g., wireless coupling) of the first and second cores 100 and 102.

Additional components are included in FIG. 3, which enable improved mounting and retention of the first and second cores 100 and 102 within the flange 50. For example, a spacer disk 150 is positioned between the first core 100 and the central cavity base 118 within the central exterior cavity 110. The spacer disk 150 (e.g., a plastic disk) may provide a flexible or pliable layer against which the first core 100 may rest when the first core 100 is mounted within the flange 50. Similarly, a spacer ring 152 is positioned between the flange 50 and a first axial end 154 of the second core 102 within the interior annular cavity 108. The spacer ring 152 (e.g., a plastic ring) may also provide a flexible or pliable layer against which the second core 102 may rest when the second core 102 is mounted within the flange 50. A retaining ring 156 is also included to retain the second core 102 within the interior annular cavity 108. Specifically, the retaining ring 156 is disposed on a second axial end 158 of the second core 102 about the annular wall 114. For example, the retaining ring 156 may be a metal, plastic, rubber, polymer, or other suitable material that may be secured about the annular wall 114 via a friction fit, interference fit, or other coupling to retain the second core 102 within the interior annular cavity 108. As will be appreciated, the spacer disk 150, spacer ring 152, and retaining ring 156 may all be formed from generally non-magnetic and low conductivity materials to reduce interference (e.g., eddy currents) between the first and second cores 100 and 102 during operation of the power and data transmission system 54.

Figure 4:
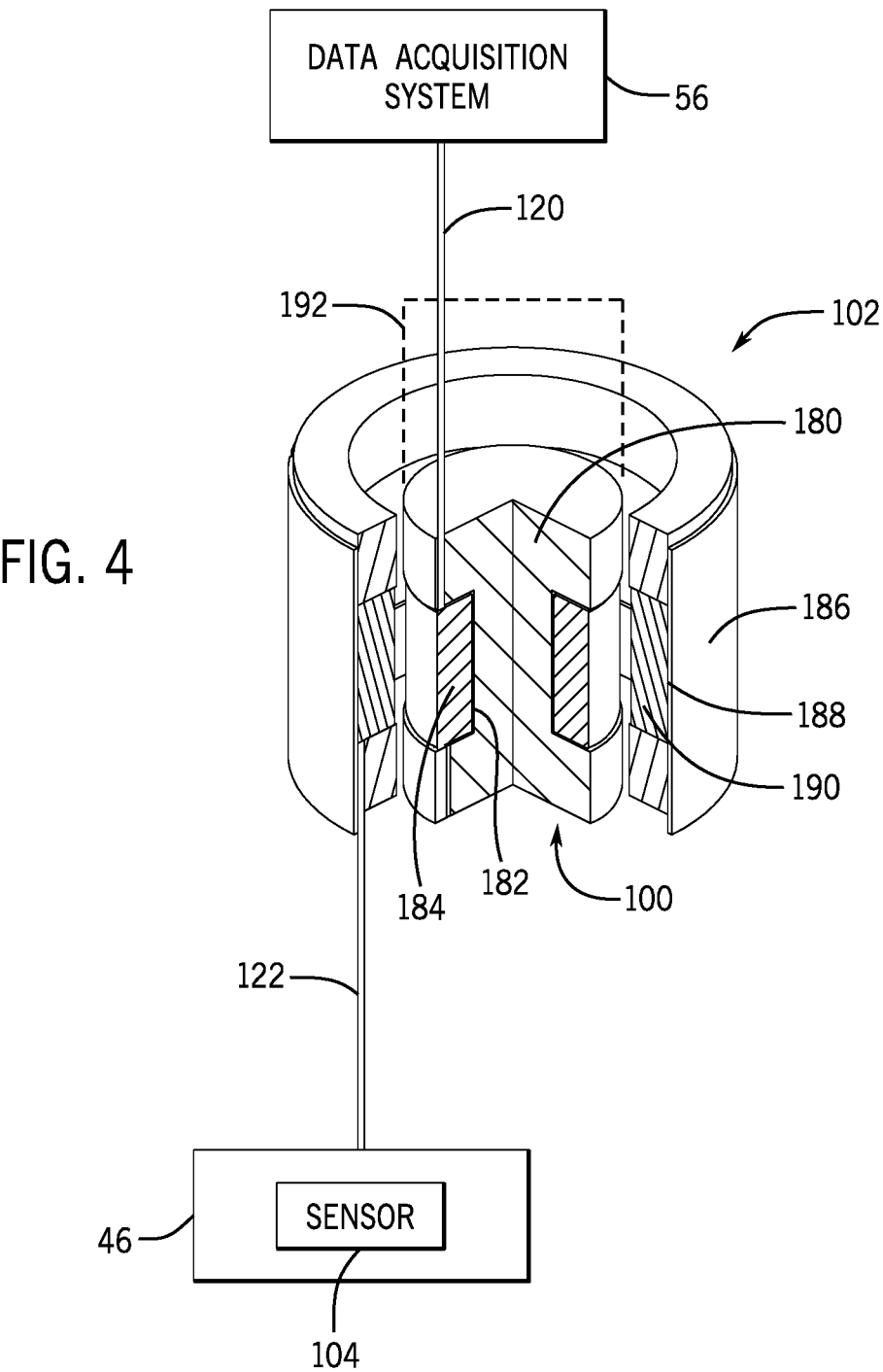
FIG. 4 is a cut-away perspective view of a primary core having a primary winding and a secondary core having a secondary winding of the power and data transmission system, in accordance with embodiments of the present disclosure.

FIG. 4 is a cut-away perspective view of the first core 100 (e.g., primary element) and the second core 102 (e.g., secondary element), illustrating the coaxial, concentric spatial relationship between the first core 100 and the second core 102 when the first and second cores 100 and 102 are mounted within the flange 50, which is not shown.

The first core 100 includes a first core body 180. The first core body 180 is a generally cylindrical body, which may be formed from a ferrite material. The first core body 180 includes a circular or annular recess 182 in which a primary coil 184 is wound about the first core body 180. The primary coil 184 is coupled to the data acquisition system 56 via the cable 120 to transfer data and power between the data acquisition system 56 and the primary coil 184. Similarly, the second core 102 includes a second core body 186. The second core body 186 is a generally annular body, which also may be formed from a ferrite material. The second core body 186 includes a circular or annular recess 188 in which a secondary coil 190 is wound within the second core body 186. The secondary coil 190 is coupled to a secondary board, which is coupled to the sensor 104 via the cable 122 to transfer data and power between the sensor 104 and the secondary coil 190.

In certain embodiments, the first core body 180 may include an extended body portion 192. When the first core 100 is positioned within the central exterior cavity 110 of the flange 50, the extended body portion 192 may extend axially outward and beyond the flange 50. The extended body portion 192 may enable an operator to readily remove the first core 100 from the flange 50 by grabbing the extended body portion 192 and pulling the first core 100 out of the central exterior cavity 110.

Figure 5:
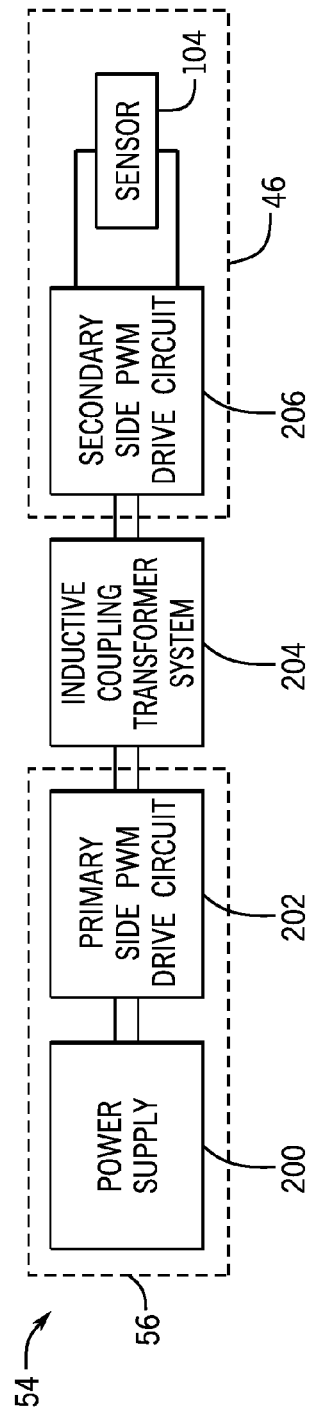
FIG. 5 is a schematic diagram of the power and data transmission system, in accordance with embodiments of the present disclosure.

FIG. 5 is a schematic diagram of an embodiment of the power and data transmission system 54. In the illustrated embodiment, the power and data transmission system 54 includes a power supply 200, a primary side pulse width modulation (PWM) drive circuit 202, an inductive coupling transformer system 204, a secondary side PWM drive circuit 206, and the sensor 104. The inductive coupling transformer system 204 includes the first core 100 and the second core 102 described above.

In certain embodiments, the power supply 200 and the primary side PWM drive circuit 202 may be components of the data acquisition system 56. However, in other embodiments, the power supply 200 and the primary side PWM drive circuit 202 may be integrated with other components, either together or separately. For example, the power supply 200 may be a separate battery or utility power supply, and the primary side PWM drive circuit 202 may be integrated with the first core 100. In operation, the power supply 200 provides power to the primary side PWM drive circuit 202, which controls the power supplied to the inductive coupling transformer system 204. For example, the power supply 200 may supply 24 volts to the primary side PWM drive circuit 202. The primary side PWM drive circuit then pulses the voltage supplied by the power supply 200 to drive a sinusoidal voltage to the inductive coupling transformer system 204.

The first core 100 (e.g., the primary coil 184) of the inductive coupling transformer system 204 receives the sinusoidal voltage from the primary side PWM drive circuit 202. As the sinusoidal voltage (e.g., first current) flows through the primary coil 184, a magnetic flux or field is generated. This magnetic field induces a current in the second core 102 (e.g., the secondary coil 190) in the inductive coupling transformer system 204. The second core 102 is electrically coupled to the secondary side PWM drive circuit 206, such that the secondary side PWM drive circuit 206 receives the current induced in the second core 102 (e.g., the secondary coil 190). As discussed below, the current received by the secondary side PWM drive circuit 206 may be sensed and filtered by the secondary side PWM drive circuit to extract data sent from the data acquisition unit 56. Additionally, the current received by the secondary side PWM drive circuit 206 is used to power the sensor 104. In certain embodiments, the secondary PWM drive circuit 206 may be integrated with the valve removal plug 46 along with the sensor 104.

As described below with reference to FIG. 6, the secondary side PWM drive circuit 206 may include a capacitor or other energy storage device that is charged by the current (e.g., secondary current) induced in the second core 102 (e.g., the secondary coil 190). The energy or voltage stored in the secondary side PWM drive circuit 206 may then be used by the secondary side PWM drive circuit 206 to generate a sinusoidal voltage or waveform (e.g., a first return current) to send data (e.g., data measured by the sensor 104) back to the data acquisition unit 56. Specifically, the secondary side PWM drive circuit 206 may drive a sinusoidal voltage to the second core 102 (e.g., the secondary coil 190) of the inductive coupling transformer system 204. The sinusoidal current (e.g., first return current) flowing through the secondary coil 190 generates a magnetic flux or field that induces a current (e.g., a second return current) in the first core 100 (e.g., the primary coil 184). The current induced in the primary coil 184 (e.g., second return current) is then sensed and filtered by the primary side PWM drive circuit 202 to extract data (e.g., data measured by the sensor 104) that is subsequently sent to the data acquisition unit 56.

Figure 6:
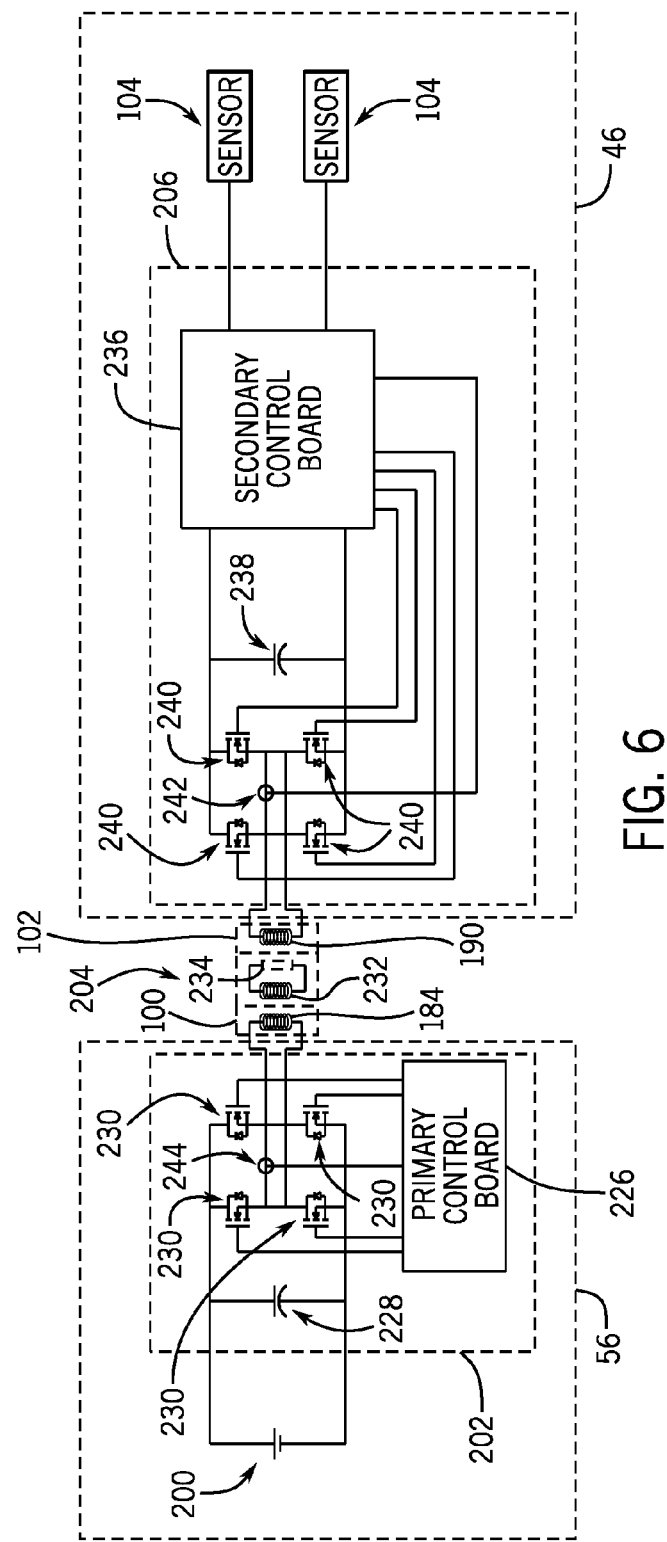
FIG. 6 is a circuit diagram of the power and data transmission system, in accordance with embodiments of the present disclosure.

FIG. 6 is an embodiment of a circuit diagram 220 of the power and data transmission system 54. As discussed above, the power and data transmission system 54 includes the power supply 200, the primary side (PWM) drive circuit 202, the inductive coupling transformer system 204, the secondary side PWM drive circuit 206, and the sensor 104. In the illustrated embodiment, the power and data transmission system 54 includes two sensors 104, i.e., a first sensor 222 and a second sensor 224. In certain embodiments, the first sensor 222 may be a temperature sensor, and the second sensor 224 may be a pressure sensor. Both sensors 104 may be integrated with the valve removal plug 46, along with the secondary side PWM drive circuit 206. However, as discussed above, other embodiments may include other numbers of sensors 104, and the sensors 104 may be configured to measure other operating parameters. Additionally, the sensors 104 may be integrated with other components of the wellhead 12 other than the valve removal plug 46.

In the illustrated embodiment, the primary side PWM drive circuit 202 includes a primary control board 226, a capacitor 228, and four transistors 230 (e.g., insulated-gate bipolar transistors (IGBTs)) arranged in a full bridge or H-bridge configuration. As described above, the power supply 200 supplies a voltage (e.g., 24 volts) to the primary side PWM drive circuit 202. The primary control board 226 pulses (e.g., switches) the transistors 230 to generate the sinusoidal voltage or waveform that is supplied to the first core 100 (e.g., primary coil 184). The capacitor 228 included in the primary side PWM drive circuit 202 may function to store a charge from the voltage supplied by the power supply 200.

The sinusoidal voltage generated by the primary side PWM drive circuit 202 is then supplied to the primary coil 184 of the first core 100. As discussed above, the sinusoidal current flowing through the primary coil 184 creates a magnetic field or flux that inducts a current flow through the secondary coil 190 of the second core 102. The phase angle and amplitude of the sinusoidal voltage (e.g., current) may be modified to maximize or optimize power transfer efficiency between the primary coil 184 and the secondary coil 190.

In the illustrated embodiment, a third coil 232 coupled in series with a resistor 234 is shown as a component of the inductive coupling transformer system 204. The third coil 232 and resistor 234 are theoretical components that represent eddy current losses (e.g., interference) that may be caused in the annular wall 114 disposed between the first and second cores 100 and 102. As discussed above, eddy currents may be induced in the annular wall 114 due to the magnetic field linking the primary coil 184 to the secondary coil 190 through the annular wall 114 and vice versa. The theoretical third coil 232 and resistor 234 may also represent resistive losses in the primary and secondary coils 184 and 190.

The current induced in the secondary coil 190 is then directed to the secondary side PWM drive circuit 206. The secondary side PWM drive circuit 206 includes a secondary control board 236, a capacitor 238, and four transistors 240 (e.g., insulated-gate bipolar transistors (IGBTs)) arranged in a full bridge or H-bridge configuration. The current induced in the secondary coil 190 may be used to charge the capacitor 238. The charge stored in the capacitor 238 may be used to power the sensors 104. The charge stored in the capacitor 238 also powers the secondary control board 236. In certain embodiments, the current induced in the secondary coil 190 may be sensed by the secondary control board 236, as indicated by arrow 242. The secondary control board 236 may filter the current measurement to extract data sent from the data acquisition unit 56 to the secondary side PWM drive circuit 206.

Once sufficient charge is stored in the capacitor 238, the secondary control board 236 may synchronize with the secondary current phase angle, which may directly correlate with a phase angle of the primary current generated by the primary side PWM drive circuit 202. For example, the secondary control board 236 may use a phase locked loop to complete this synchronization. Thereafter, the secondary control board 236 may begin pulsing (e.g., switching) the transistors 240 to generate a sinusoidal voltage or waveform that is supplied to the secondary coil 190. The sinusoidal voltage supplied to the secondary coil 190 may be modulated to send data measured by the sensors 104, which are coupled to the secondary control board 236.

As the secondary current generated by the secondary side PWM drive circuit 206 flows through the secondary coil 190, a magnetic field or flux is generated, which induces a current in the primary coil 184. As indicated by arrow 244, this current may be sensed by the primary control board 226.

The primary control board 226 may filter the current measurement to extract data (e.g., data measured and provided by the sensors 104). The extracted data may then be sent to the data acquisition unit 56, stored in the data acquisition unit 56, and/or otherwise monitored or used by an operator of the mineral extraction system 10.

Figure 7:
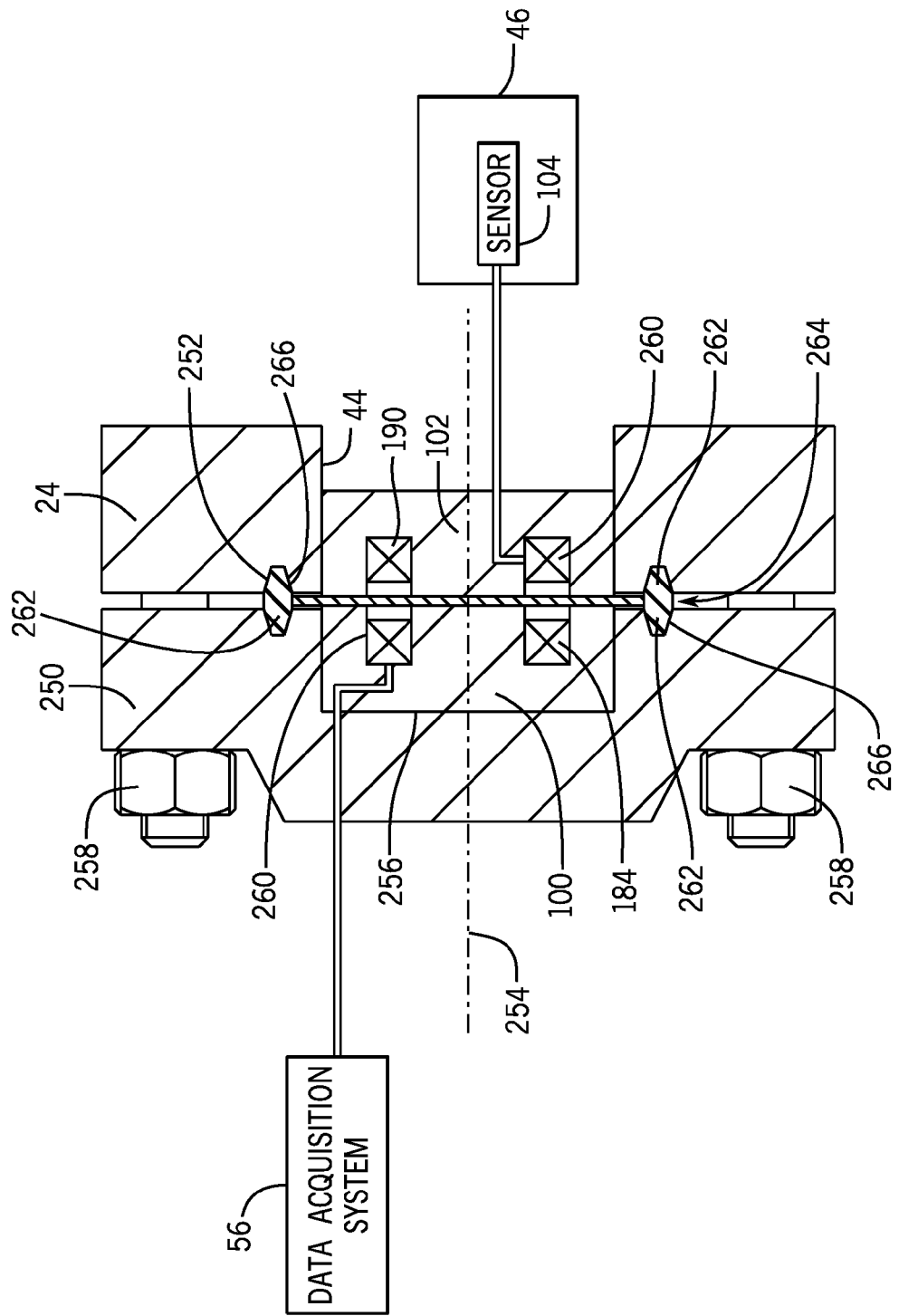
FIG. 7 is a cross-sectional side view of a flange having a power and data transmission system, in accordance with embodiments of the present disclosure.

FIG. 7 is a cross-sectional side view of another embodiment of a flange 250 and the power and data transmission system 54 coupled to the tubing spool tree 24. In the illustrated embodiment, the flange 250 and the power and data transmission 54 are used with a modified ring seal 252 disposed between the flange 250 and the tubing spool tree 24. Specifically, the modified ring seal 252 is a solid barrier (e.g., without any apertures) disposed over the side outlet 44 of the tubing spool tree 24 with the first core 100 and the second core 102 disposed on opposite sides of the modified ring seal 252. The first and second cores 100 and 102 operate as described above (e.g., via inductive coupling) to enable power and data transmission between the data acquisition system 56 and the sensor 104 without apertures formed in the modified seal ring 252 for cables or wires.

In the illustrated embodiment, the first and second cores 100 and 102 are axially offset with one another relative to a central axis 254 of the flange 250. The first core 100 is disposed within an inner recess 256 of the flange 250, and the flange 250 is secured to the tubing spool tree 24 (e.g., via bolts 258), such that the first core 100 abuts the modified ring seal 252. The second core 102 is secured within the side outlet 44. For example, the second core 102 may be threaded, welded, or otherwise secured within the side outlet 44. The primary and secondary coils 184 and 190 are similarly wound within respective recesses 260 (e.g., annular recesses) formed in the first and second cores 100 and 102, respectively. As shown, the recesses 260 of the first and second cores 100 and 102 face one another on opposite sides of the modified ring seal 252.

As similarly discussed above with respect to the annular wall 114, the modified ring seal 252 may be formed from a low conductivity, non-magnetic material to enable energy transmission between the first and second cores 100 and 102. For example, the modified ring seal 252 may be formed from a metal, metallic alloy, plastic, polymer, ceramic, or other suitable material. The modified ring seal 252 further includes axial protrusions 262 formed at a radially outward edge 264 of the modified ring seal 252. The axial protrusions 262 fit within respective seal grooves 266 of the flange 250 and the tubing spool tree 24. As shown, the seal grooves 266 extend about the side outlet 44. The engagement of the axial protrusions 262 and the seal grooves 266 may improve the pressure barrier created over the side outlet 44 by the modified seal ring 252 and the flange 50.

As described in detail above, present embodiments are directed toward flanges 50 or other barriers (e.g., the modified seal ring 252) and the power and data transmission system 54 for use with the flanges 50 or other barriers. In particular, the flange 50 and power and data transmission system 54 enable the measuring of one or more operating parameters (e.g., temperature, pressure, etc.) within the wellhead 12 without any aperture or penetration in the flange 50. In other words, power and data may be transmitted to and from the data acquisition unit 56 external to the wellhead 12 and sensors 104 within the wellhead 12 without wires or cables extending through the flange 50 and coupling the data acquisition unit 56 and the sensors 104. As such, the pressure barrier created by the flange 50 may be solid and uninterrupted. For example, the flange 50 and power and data transmission system 54 may be mounted to the wellhead 12 over the side outlet 44, where the side outlet 44 has the valve removal plug 46 with one or more integrated sensors 104. The operation of the flange 50 and the power and data transmission system 54 enables power and data transmission from the external data acquisition unit 56 and the valve removal plug 46 sensors 104 without compromising a pressure barrier sealed by the flange 50. In this manner, collection of data within the wellhead 12 may be improved, while also improving pressure containment within the wellhead 12. While the embodiments discussed above have been described in the context of the tubing spool tree 24 with the annular region 48, other embodiments of the flange 50 (or flange 250 and modified seal ring 252) and the power and data transmission system 54 may be used with other components of the mineral extraction system 10 to measure operating parameters in other areas of the mineral extraction system 10 without compromising a pressure barrier created by the flange 50.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
 a flange configured to couple to a wellhead component of a mineral extraction system, comprising:
  a base of the flange;
  an exterior annular tapered portion extending from the base;
  an interior annular wall extending from the exterior annular tapered portion; and
  a central cavity base fixed to an axial end of the interior annular wall, wherein the interior annular wall and the central cavity base at least partially define a central exterior cavity exposed to an exterior of the wellhead component, and wherein the interior annular wall and the central cavity base at least partially define an interior annular cavity between the flange and the wellhead component; and
 an inductive power and data transmission system mounted within the flange, wherein the inductive power and data transmission system comprises a first component and a second component, wherein the first and second components are separated by the interior annular wall, and the first and second components axially overlap with one another relative to a central axis of the flange.

2. The system of claim 1, wherein the first component comprises a first transformer core disposed within the central exterior cavity, and the second component comprises a second transformer core disposed within the interior annular cavity.

3. The system of claim 2, wherein the first transformer core comprises: a first core body and a first magnetic coil wound about the first core body, the second transformer core comprises a second core body and a second magnetic coil wound within the second core body, and the first and second transformer cores are configured to inductively couple with one another.

4. The system of claim 1, wherein the base, the exterior annular tapered portion, the interior annular wall, and the central cavity base are integrally formed as one piece.

5. The system of claim 1, wherein the central exterior cavity and the interior annular cavity are generally coaxial and concentric with one another.

6. The system of claim 1, wherein the flange is formed from a generally non-magnetic, low conductivity material.

7. The system of claim 6, wherein the generally non-magnetic, low conductivity material comprises a nickel-chromium-based alloy.

8. The system of claim 1, wherein the wellhead component comprises a side outlet extending from an exterior surface of the wellhead component to an annular region within the wellhead component, and wherein the flange is mounted over the side outlet.

9. The system of claim 8, comprising a valve removal plug secured within the side outlet, wherein the valve removal plug comprises an integrated sensor configured to measure a wellhead operating parameter within the annular region, and wherein the integrated sensor is electrically coupled to the first component or the second component of the inductive power and data transmission system.

10. A method, comprising:
flowing a first current through a primary magnetic coil of a first transformer core to generate a first magnetic field, wherein the first transformer core is disposed on a first side of a flange mounted to a wellhead component, and wherein the first transformer core is removable from the first side of the flange when the flange is mounted to the wellhead component;
inducing a second current in a secondary magnetic coil of a second transformer core, wherein the second transformer core is disposed on a second side of the flange, wherein the second side of the flange and the wellhead component are in a sealing arrangement when the flange is mounted to the wellhead component; and
powering a sensor disposed within a side outlet of the wellhead component with the second current.

11. The method of claim 10, comprising generating the first current with a power supply and a primary side pulse width modulation drive circuit disposed on the first side of the flange, such that the first current comprises a sinusoidal waveform.

12. The method of claim 11, comprising storing the second current in a capacitor of a secondary side pulse width modulation drive circuit disposed on the second side of the flange.

13. The method of claim 12, comprising flowing a first return current through the secondary magnetic coil with the secondary side pulse width modulation drive circuit to generate a second magnetic field and induce a second return current in the primary magnetic coil, wherein the second return current comprises data from the sensor.

14. The method of claim 13, comprising filtering the second return current with the primary side pulse width modulation drive circuit to extract the data from the sensor.

15. A wellhead system, comprising:
a wellhead component, comprising a side outlet extending from an exterior of the wellhead component to a pressure containing region within the wellhead component;
a flange mounted over the side outlet, wherein the flange comprises:
a central exterior cavity exposed to the exterior of the wellhead component; and
an inner annular cavity exposed to the side outlet of the wellhead component, wherein the central exterior cavity and the inner annular cavity are completely separated by an inner annular wall of the flange; and
a power and data transmission system, comprising:
a first transformer core disposed within the central exterior cavity; and
a second transformer core disposed within the inner annular cavity,
wherein the first and second transformer cores are configured to inductively couple to one another.

16. The wellhead system of claim 15, wherein the first transformer core comprises a generally cylindrical core body comprising a first annular recess formed in the generally cylindrical core body and a first magnetic coil wound about the generally cylindrical core body and within the first annular recess, and wherein the second transformer core comprises an annular core body comprising a second annular recess formed in the annular core body and a second magnetic coil wound within the second annular recess.

17. The wellhead system of claim 15, wherein the first transformer core is electrically coupled to a data acquisition system external to the wellhead component, and the second transformer core is electrically coupled to a valve removal plug secured within the side outlet.

18. The wellhead system of claim 17, wherein the valve removal plug comprises an integrated sensor configured to measure an operating parameter within the pressure containing region.

19. The wellhead system of claim 15, comprising a metal to metal ring gasket disposed between the wellhead component and the flange.

* * * * *